United States Patent [19]

Alafandi et al.

[11] 4,310,441

[45] Jan. 12, 1982

[54] LARGE PORE SILICA-ALUMINA GELS AND METHOD OF PRODUCING THE SAME

[75] Inventors: Hamid Alafandi, Woodland Hills; Dennis Stamires, Newport Beach, both of Calif.

[73] Assignee: Filtrol Corporation, Los Angeles, Calif.

[21] Appl. No.: 81,655

[22] Filed: Oct. 4, 1979

Related U.S. Application Data

[63] Continuation-in-part of Ser. No. 769,118, Feb. 16, 1977, Pat. No. 4,142,995, Ser. No. 874,755, Feb. 8, 1978, Ser. No. 935,628, Aug. 21, 1978, and Ser. No. 3,879, Jan. 16, 1979.

[51] Int. Cl.$^3$ .............................................. B01J 21/12
[52] U.S. Cl. ................................. 252/453; 252/455 R
[58] Field of Search ................ 252/453, 455 Z, 455 R

[56] References Cited

U.S. PATENT DOCUMENTS 3,210,294 10/1965 Chomitz et al. ..................... 252/453

*Primary Examiner*—Carl F. Dees
*Attorney, Agent, or Firm*—Philip Subkow; Bernard Kriegel

[57] ABSTRACT

A silica-alumina gel derived from a cationic aluminum source and also an anionic aluminum source and processes for producing such gel.

35 Claims, 2 Drawing Figures

Fig. 1.

LARGE PORE SILICA-ALUMINA GELS AND METHOD OF PRODUCING THE SAME

This application is a continuation-in-part of Ser. No. 769,118 filed Feb. 16, 1977, now U.S. Pat. No. 4,142,995, issued Mar. 6, 1979, Ser. No. 874,755 filed Feb. 8, 1978, Ser. No. 935,628, filed Aug. 21, 1978 and Ser. No. 003,879, filed Jan. 16, 1979.

BACKGROUND OF THE INVENTION

The problem of supplying a suitable quantity of fossil fuels has focused increased attention on the higher molecular weight fossil fuels, both petroleum and synthetic oils, such as those derived from coal, shale and tar sands. Such oils in many cases contain metal compounds and/or sulfur compounds or nitrogen compounds which complicate the problem of catalytic conversion of such oil, such as cracking, and hydro treating processes, for example, hydroforming, hydrocracking, hydro-desulfurization. Catalysts and substrates employed by the prior art in producing such catalysts are porous with heterogeneous assembly of pores of various shapes and sizes.

It is quite generally recognized that it is desirable that the catalysts for such process and the substrates employed producing the catalysts have available pore volume and available surfaces which are in pores of the larger sizes and that there be only minor portion of the available pore volume and pore surfaces in the pores of the smaller sizes. See for example U.S. Pat. Nos. 2,890,162, and 3,944,482.

The identification of volume and surface areas of pores of various configurations in any system of pores in a porous solid is still empirically determined. A common method is to employ nitrogen to develop an adsorption isotherm and also in some cases a desorption isotherm. The value of the total pore volumes, the total surface area of the pores of a porous solid are determined from the isotherms (see Brunauer "Adsorprtion Of Gases And Vapors", vol. 1, Princeton Univ. Press, 1943, Brunauer et al., J.A.C.S., vol. 60, pg. 309 etc. (1938).

The distribution of the values of the pore volume and surface area in various ranges of the equivalent pore diameters in a heterogeneous pore structure may be determined from the nitrogen isotherms.

A widely used apparatus and that used in the following examples for determination of the above parameters for nitrogen isotherms employs a computerized apparatus. (Digisorb 2500 manufactured by the Micromeritic Instrument Corp. of 5680 Goshen Springs Road, Norcross, Ga. 30071.)

The procedure employing this instrument determines the parameters for a nitrogen adsorption and a desorption isotherm and determines the so-called B.E.T. surface area by application of equation as given on page 312 of the above J.A.C.S. article (known as the B.E.T. equation). The slope and intercept of the linear relation according to that equation is determined. The equation evaluates the volume of the gas as a mono molecular layer of nitrogen adsorbed on the surfaces of the pores. From the known diameter of the nitrogen molecule and the volume of the monolayer, the magnitude of the surface of the pores carried by the mono layer is evaluated. To evaluate the slope and intercept of the above linear relation, the separate values of the relative pressure (P/Po) of the selected portion of the isotherm are chosen. P is the local pressure selected and Po is the saturation pressure. The linear relation is determined as the least square fit to the above B.E.T. linear equation.

The B.E.T. surface area (S) in meters square per gram is given by the following equation which includes the value of the area covered by the nitrogen molecule $16.2 A^2$. According to the equation:

$$S = \frac{4.35}{a + b} \quad \text{Equation 1}$$

where S is the surface area in square meters per gram ($\overline{M}^2/gm$); "a" is the above intercept of the linear relation and "b" is the slope of said linear relation. This value is referred to as the BET surface, and is so referred to in this application.

The pore volume is determined from the volume of nitrogen gas adsorbed at saturation evaluated at standard conditions converted to liquid nitrogen by multiplying the volume of gaseous nitrogen adsorbed at standard conditions by the factor $1.558 \times 10^{-3}$ to yield the equivalent volume of adsorbed nitrogen in cc/gm herein referred to as "Specific Pore Volume".

In determining the distribution of the pore volume and pore surfaces in the pores of various diameters in the sample, the Kelvin radius, which assumes a cylindrical pore is determined corresponding to the various levels of relative pressures in the isotherms. Adjustment is made to reflect the thickness of the adsorbed nitrogen in the pores as a function of the various relative pressures ($P/P_o$) of the isotherms.

The thickness of the adsorbed nitrogen (t) is given by:

$$t = 3.54 \left( \frac{-5}{\ln(P/P_o)} \right)^{\frac{1}{3}} \quad \text{Equation 2}$$

where ln $P/P_o$ is the natural log of the relative pressure $P/P_o$ of the selected portion of the desorption isotherm.

To evaluate the surface area ($\overline{M}^2/gm$) and pore volume (cc/gm) in the pores of different pore radii corresponding to the various values of ($P/P_o$) along the isotherms (in the present case, the desorption isotherm), the following relation is followed in the above Digisorb apparatus. The values of pore volume and pore surface stated in the following portion of this specification are those derived from this apparatus.

The radius (r) is the so-called Kelvin radius derived from the Kelvin equation (See Brunauer "Adsorption of Gases And Vapors" and Lippius et al, "Journal of Catalysis", vol. 3, page 32 at p. 35 (1964)). The radius of the pore is taken as:

$$r = r_c - t = \left[ \frac{-9.53}{\ln(P/P_o)} \right] \quad \text{Equation 3}$$

where r is the radius of the pore; t is the thickness and r is the portion of the radius which is not occupied by the layer thickness (t). Each increment of condensate desorbed as the relative pressure is decreased in the developed desorption isotherm, is comprised of gas evaporated from pores that were previously filled with liquid and from the surface of unfilled pores.

$$Dv_p = Dv - Dv_s$$

Dv is obtained directly from the desorption isotherm.

$$Dv_s = Dt \Sigma DS_p$$

where Dt is the change in thickness t, and $\Sigma DS_p$ is all pore surface area other than those of the filled pores. For each desorption increment the surface area attributable to any group of pores of radius $r_1$ and $r_2$ is given by the following:

$$DS_p = \frac{2DV_p}{\bar{r}_c} \qquad \text{Equation 5}$$

where $\bar{r}_c$ is the average of the group $r_1$–$r_2$, i.e., $0.5(r_1 + r_2)$ pore radii desorbed and $DV_p$ is the corresponding pore volume of the group and is given by $$DV_p = Dv \left( \frac{\bar{r}_c}{\bar{r}_c - t} \right)^2 \qquad \text{Equation 6}$$

Since the desorption isotherm is measured in terms of gas volume at standard conditions and the surface area and pore volume as above requires the conversion to equivalent liquid parameters the above conversion of the isotherm data to surface area and pore volume employing the above constants are applied here also. (See equation 1 and conversion factors). The equivalent pore volume and pore surface area for each pore radius interval is obtained by applying the above computation scheme.

The volume $v_1$ of liquid desorbed from one pore radius $r_o$ to the next smaller pore radius $r_1$, and is given by the following relation $$v_1 = \left[ \frac{\bar{r}_1}{\bar{r}_1 - t} \right]^2 q \qquad \text{Equation 7}$$

Where $\bar{r}_1$ is the average next smaller interval $0.5 r_0 - r_1$) and (t) is the thickness at $\bar{r}_1$ (Equation 2).

$$q = v_o - v_1$$

q is equal to the volume of gas (as liquid) desorbed between radius $r_o$ and $r_1$, $v_o$ is the volume of gas (as liquid) adsorbed at $r_o$ and $v_1$ is the volume of gas adsorbed (as liquid) at $r_1$. t has the meaning of Equation 2.

The pore volume and pore surface corresponding to each increment of relative pressure of the desorption isotherm and the corresponding volume and corresponding average of the corresponding pore radii may then be determined by applying the above consideration to each step of the desorption isotherm. The above computation scheme is applicable down to 10 Angstrom radius.

The relation of the surface area in the pores of radius r corresponding to the increment of desorbed gas (as liquid) is given by the following relation $$DS_p = \frac{2V_p}{\bar{r}_c} \qquad \text{Equation 10}$$

From the above, the value of the pore volume is evaluated as cubic cm per gram (cc/gm) and the value of the pore surface (evaluated as meters square per gram ($\overline{M}^2$/gm)) for each selected interval of pore radii (or diameter) corresponding to the equivalent interval of the relative pressure (P/P$_o$) of the isotherm, in the present case, from the desorption isotherm. In the case of the examples reported, the ranges of the intervals of (P/P$_o$) of the desorption isotherm were selected to be equivalent to the following intervals of radii $r_1$ and $r_2$. For diameters between 20 to 100 Angstroms, the interval is 5 Angstroms; between 100 and 160 Angstroms, the interval is 10 Angstroms: between 160 and 300 Angstroms, the interval is 20 Angstroms; between 300 and 500 Angstroms, the interval is 50 Angstroms; and between 500 and 600 Angstroms, the interval is 100 Angstroms.

The values of pore volume and pore surface for any greater interval are obtained by summing the pore surfaces and pore volumes in the pores of each of the smaller intervals contained in the greater interval to wit 20 to 50; 50 to 200 and 200 to 600 Angstroms diameters. The intervals of radii as stated above signify that the radii is more the lowest value for example 20, and less than the highest value, for example 50 Angstroms diameter.

The surface areas and pore volume for the several ranges of pore diameter and the total pore volume and surface are obtained and determined from the desorption isotherms and herein referred to as the "desorption area", or the "desorption pore volume".

Where in this specification we refer to pore volume either generally or by number, the reference is intended to be evaluated per gram of the gel on a dry basis such as obtained by drying at 100° C. for a prolonged period of time or or as specified after calcining the gel as for example at 1000° F. for several hours.

STATEMENT OF THE INVENTION

We have discovered that the ammoniated silica-alumina gels which are the subject of our parent applications whose molecular ratio is in the range of 1 to 3 moles of SiO$_2$ per mole of Al$_2$O$_3$ formed from sodium silicates with aluminum in cationic form as aluminum salts, produces silica-alumina gels in which a major proportion of the desorption pore volume which is present in the pores of 20 to 600 Angstroms are concentrated in the pores of 20 to 50 Angstroms and the pore volume and the pores of greater pore diameter is substantially less. The ratios of the pore volume in the pores of less than 50 Angstroms to those above 50 Angstroms is substantially greater than 1, for example by about one order of magnitude.

We have discovered that if the aluminum which is employed in forming the silica-alumina gel is present in major proportions in the form of anionic alumina, e.g. sodium aluminate and a minor proportion as cationic aluminum, the above ratios of volumes are substantially less than 1. The ratio of the desorption pore volume in the pores of 20 to 50 Angstroms diameters to the desorption pore volume in the pores of 50 to 200 Angstrom diameters is substantially less than 1. The total pore volume in all the pores in the cationic-anionic gel may be as large or greater than that attainable for the cationic gel of similar $SiO_2/Al_2O_3$ ratio.

We have also discovered in both the cationic gel and the anionic gels of suitable cationc-anionic ratio that the ratio of the desorption pore volumes in the pores of 20 to 50 Angstroms to the desorption pore volume in the pores of 50 to 200 Angstroms will be substantially reduced, that is that the desorption pore volume of the pores in the pores of a range of 50 to 200 Angstrom diameter may be augmented while the desorption pore volume in the pores of 20 to 50 Angstroms diameter may be substantially deminished by hydrothermal treatment. Such hydrothermal treatment as we have found when applied to the cationically derived silica-alumina gel of the above composition may result in a pore structure in which the above ratio of the desorption pore volumes is converted from substantially more than one to a ratio substantially less than one.

The silica alumina gels of our invention may be therefore characterized as a large pore silica-alumina gel defining a large pore silica-alumina gel as one in which the ratio of the desorption pore volumes in the pores which are in the range of 20 to 50 Angstroms diameter to the desorption pore volumes in the pores in the range of 50 to 200 Angstroms diameter is substantially less than 1 and in such gels, a major proportion of the desorption pore volumes exists in pores of greater than 50 Angstroms diameter, for example in excess of about 50% while the desorption pore volumes of all the pores in the range of 20 to 600 Angstrom diameter existing in the pores of 20 to 50 Angstroms diameter is substantially less than 50%. The total desorption pore volume in the pores of 20 to 600 Angstrom diameter is about 0.6 cc/gm or greater. All these parameters determined from the desorption isotherms as aforesaid.

The silica-alumina gels of our invention having the above pore structure may be made by reacting sodium silicate with cationic aluminum for example an aluminum salt and heating the gel in an aqueous medium at temperatures above the atmospheric boiling point of the aqueous medium under pressure, the gel having a nominal molar composition in the range of 1 to 3 moles of $SiO_2$ per mole of $Al_2O_3$. Such gels have been shown in the above parent applications when treated in an aqueous medium in such a treatment under autogenous pressure to have improved cracking activity.

Gels of the above pore structure may also be made according to our invention by reacting sodium silicate with an alumina source including, for example, both anionic aluminum, for example sodium aluminate, and cationic aluminum, i.e., an aluminum salt for example an aluminum salt of a mineral acid such as $H_2SO_4$, HCl, Or $HNO_3$, to give a gel of the above nominal molar $SiO_2$ to $Al_2O_3$ ratio by limiting the ratios of the anionic aluminum source to the cationic aluminum source such that the equivalent weight of the $Al_2O_3$ provided by the anionic alumina source is less than 100% and more than 50% of the total equivalent weight of the $Al_2O_3$ in both alumina sources.

Our invention will be described in connection with FIGS. 1 and 2 which charts properties of gels of which exemplify our invention and which are formed as described in the following examples.

The following example illustrates processes by which the gels of our invention may be formed and the effect of the various parameters in such processes which affect the pore size and pore size distribution. In each of the following examples, the ratio of the weight of the sodium silicate expressed as $SiO_2$ on a volatile free basis and the weight of the aluminum salt or the aluminate source or both the aluminum salt and aluminate expressed as $Al_2O_3$ on a volatile free basis were used so as to establish in the reaction mixtures, the equivalent of fifty-two weight percent (52%) of $Al_2O_3$ and the equivalent of forty-eight (48%) weight percent of $SiO_2$, both taken on an anhydrous basis, the sum of the equivalent weights of $Al_2O_3$ and the $SiO_2$ being 100%.

EXAMPLE 1

A sodium silicate solution (28% $SiO_2$ and 18.9% $Na_2O$) was mixed with a water solution of aluminum sulfate. The temperature of the mixture was 160° F. The mixture was then mixed for 6 hours. The pH of the mixture was 3.1 at a temperature of 90° F. A solution of ammonium hydroxide was added in quantity sufficient to raise the pH to 9.2. An additional volume of water equal to the volume of the ammonia solution was added and the batch was heated for 30 minutes at 150° F. to form a mixture at a pH of 8.9. The batch was filtered and dried, the following analysis on a volatile free basis:

$SiO_2$ = 48% by weight
$Al_2O_3$ = 51.1% by weight
$Na_2O$ = 0.27% by weight
$NH_3$ = 3.67% by weight The B.E.T. Surface area equaled 457 $\overline{M}^2$/gm. The Specific Pore Volume equaled 0.51 cc/gm.

The distribution of the desorption surface area and desorption pore volume amoung the pores of various ranges of pore diameter in Angstrom units is given in Table 1.

EXAMPLE 2

The various samples reported in this example were all formed by mixing the sodium silicate of Example 1 with sodium aluminate and adding to the thoroughly mixed mixture of sodium silicate and sodium aluminate the required amount of aluminum sulfate solution. Ratios of the aluminate (anionic aluminum) to the sulfate (cationic aluminum) and the total weight of the anionic and cationic aluminum was such as to provide the required portion of alumina for the silica alumina gel. The components of the mixture were such as to supply the designated weight ratio of silica to alumina required for the silica-alumina gel which was produced.

Sample 1. The procedure of Example 1 was followed employing the ratios of the sodium aluminate (anionic aluminum) and the aluminum sulfate (cationic aluminum) were such as to be equivalent to 50% by weight of the required $Al_2O_3$ in the gel from the anionic aluminum and 50% from the cationic aluminum. The aluminum sulfate on addition to the mixed aluminate and silicate and brought the pH to 4.4 and after adjustment, the pH was 8.5 as a result of addition of ammonium hydroxide. The gel was heated at 180° F.

The filtered gel was dried at 100° C. The B.E.T. Surface area equaled 319 $\overline{M}^2$/gm. The Specific Pore Volume equaled 0.36 cc/gm.

The distribution of the desorption surface areas and the desorption pore volumes among the pores of various ranges of diameter is given in Table 1.

Sample (2). The procedure of Example 2 was followed but the ratio of the sodium aluminate to the aluminum sulfate was sufficient to supply 65% by weight of the required alumina of the gel from the anionic alumina and 35% from the cationic aluminum. The mixture of the aluminate and the silicate was at a pH of 13. The addition of the aluminum sulfate brought the pH to 6.5. The gel was strongly stirred and the pH was adjusted with ammonium hydroxide to a pH of 8.5 and heated at 180° F. The filtered gel was dried at 100° C.

The distribution of the desorption surface area and desorption pore volume among the pores of various ranges of diameter is given in Table 1.

The B.E.T. Surface Area equaled 318.5 $\overline{M}^2$/gm. The Specific Pore Volume equaled 0.36 cc/gm.

Sample (3). The procedure of this Example was followed by employing sodium aluminate equivalent to 75% of the $Al_2O_3$ required for the gel. To the mixture of the silicate and aluminate, the aluminum sulfate solution was added in amount to supply the remainder of the required alumina and thoroughly mixed. The pH of the mixture was 7.9. This pH was adjusted to 8.5 by addition of ammonium hydroxide and held for 1 hour at 180° F. The gel was filtered and washed. It was then dispersed in ammonium nitrate solution and again filtered and washed and the washed filtrate was dried at 100° C. The analysis of the gel on a volatile basis was as follows:

$SiO_2$ = 52.4% by weight
$Al_2O_3$ = 44.0% by weight
$Na_2O$ = 3.21% by weight
$NH_3$ = 3.37% by weight
$SO_3$ = 0.19% by weight
$NO_3$ = 0.89% by weight The B.E.T. Surface Area equaled 360 $\overline{M}^2$/gm. The Specific Pore Volume equaled 0.70 cc/gm.

The distribution of the desorption pore volume and desorption surface area in the various ranges of pore diameter in Angstrom units is given in Table 1.

Sample (4). The procedure of this Example was followed employing sodium aluminate sufficient to supply 83% by weight of the $Al_2O_3$ required for the gel, the remainder of 17% was supplied by aluminum sulfate. The silicate was adjusted to a pH of 11 with nitric acid and mixed with the aluminate. The aluminum sulfate was added and throughly mixed. The pH of the mixture was adjusted to a pH of 8.5 and heated to 160° to 180° F. while the pH was maintained at 8.5. The gel was dried as above.

The B.E.T. Surface Area equaled 331 $\overline{M}^2$/gm. The Specific Pore Volume equaled 0.59 cc/gm.

The desorption pore volume and desorption surface area in the pores of various ranges of diameter in Angstrom Units is given in Table 1.

Sample (5). The procedure of this Example was followed except that the alumina provided by the anionic aluminum (sodium aluminate) was followed so that 90% by weight of the required alumina and the remaining 10% was supplied by the cationic aluminum (aluminum sulfate). The gel was filtered and dried as above.

The B.E.T. Surface Area equals 277 $\overline{M}^2$/gm. The Specific Pore Volume equals 0.59 cc/gm.

The distribution of the desorption surface area and the desorption pore volume in the pores of various ranges of diameters in Angstrom units is given in Table 1.

EXAMPLE 3

The procedure of Example 2, Sample 3 was followed, except that the sodium aluminate and the aluminum sulfate were first mixed in the ratios employed in Sample 3. The pH of the mixture was 10.3. The mixture was added to the sodium silicate which was at a pH of 11. The mixture gelled at a pH of 11.4. The pH was adjusted to 8.5 and filtered and heated to Sample 1. The heated sample was filtered and the filter cake was dried at 100° C.

The B.E.T. Surface Area equaled 306 $\overline{M}^2$/gm. The Specific Pore Volume equaled 0.67 cc/gm. The distribution of the desorption surface area and the desorption pore volume among the pores of various ranges of diameter is given in Table 1.

EXAMPLE 4

The filter cake of Example 2, Sample 3, was heated in deionized water (pH 6.5 to 7) for 2 hours at 400° F. in an autoclave. The gel was filtered, washed and dried at 100° C. The filter cake was analyzed with the following results on a volatile free basis:

$Na_2O$ = 3.30% by weight
$SO_3$ = 0.24 by weight
$NH_3$ = 2.09% by weight

The B.E.T. Surface Area equaled 336 $\overline{M}^2$/gm. The Specific Pore Volume equaled 0.87 cc/gm.

The distribution of the desorption pore volumes and desorption surface areas in pores of various ranges of pore diameter is given in Table 1.

EXAMPLE 5

Sodium silicate of Example 1 was diluted to 4% $SiO_2$ and adjusted with nitric acid to give a pH of 11 to 11.5, and then was mixed with sodium aluminate. The mixture had its pH adjusted to 11 to 11.5 with more nitric acid. The mixture was diluted to facilitate mixing. Aluminum nitrate was then slowly added. The pH was adjusted to a pH of 6 by addition of ammonium hydroxide. Mixing was continued for about 45 minutes at which time the pH had risen to 7.0.

The weight ratios of the aluminum nitrate and sodium aluminate were such as to provide the equivalent ratio of 75% of the alumina of the gel as anionic aluminum and 25% cationic aluminum as in Example 2, Sample 3.

The slurry was filtered and the filter cake was washed. A part of the filter cake was reslurried in ammonium nitrate and refiltered. The filter cake thus produced was reslurried in an ammonia solution to a pH of 9.9 and heated for an hour at 155° to 160° F. The slurry was filtered and washed with deionized water and filtered and washed again with deionized water.

The wet cake was mixed with ammonia to a pH of 10 and heated to a temperature of 160° F. for an hour.

The slurry was then filtered and washed. The washed filtrate was dried to about 40% water and kneaded to form a extrusion mix and extruded through a die while cooling the extruder to reduce the temperature rise which developed during extrusion.

The resulting cylindrical pellets were dried for 12 hours at 330° F. and heated in a closed muffle for 2 hours at 900° F., then held at 1200° F. for 9 hours. The pellets had an average diameter of 0.063 and an average length of 0.184". The pellets were analyzed and showed the following analysis on a volatile free basis:

$SiO_2$ = 49.2% by weight
$Al_2O_3$ = 50.7% by weight
$Na_2O$ = 0.08% by weight
$NH_3$ = 0.03% by weight The B.E.T. Surface Area equaled 324 $\overline{M}^2$/gm. The Specific Pore Volume equaled 0.68 cc/gm.

The distribution of the desorption pore volumes and desorption surface area in the various ranges of pore diameters in Angstroms as given in Table 1.

EXAMPLE 6

The gel of Example 1 was heated with water for 2 hours at 400° F. and filtered and dried as in Example 1. The Specific Pore Volume equaled 0.51 cc/gm, and the B.E.T. Surface Area equaled 168 $\overline{M}^2$/gm. The distribution of the desorption pore volumes and desorption surface areas in pores of different diameter ranges in Angstrom units is give in Table 1.

EXAMPLE 7

Sodium aluminate was acidified with nitric acid to a pH of 5. The sodium silicate was acidified with a nitric acid to a pH of 5.9. The two solutions were mixed and heated to boiling for 10 minutes at a pH of 5 and filtered and washed. The filter cake was slurried in water at a pH of 4.2 and again filtered and washed. The filter cake was slurried and washed and reslurried and the pH adjusted to 9.5 at ambient temperature with ammonium hydroxide and heated for 10 minutes at 180° F. to 100° F. and filtered and washed. The filtrate was at a pH of 8.6. The filter cake contained 0.22% $Na_2O$ on a volatile free basis. The filter cake was dried as before.

The B.E.T. Surface Area equaled 545 $M^2$/gm. The Specific Pore Volume equaled 0.46 cc/gm. The distribution of the desorption pore volumes and the desorption surface areas in the pores of various ranges of diameters in Angstrom units are given in Table 1, to wit in the range of 20-600 Angstroms, 20-50 Angstroms, 50-200 Angstroms.

Table 1 tabulates the effect of the percent anionic aluminum and other reaction parameters, employed in forming the gels of our invention. FIGS. 1 and 2 plot the data given in Table 1.

Gels within the aforesaid range less than 100% and more than 50% are large pore gels.

Figure 1:
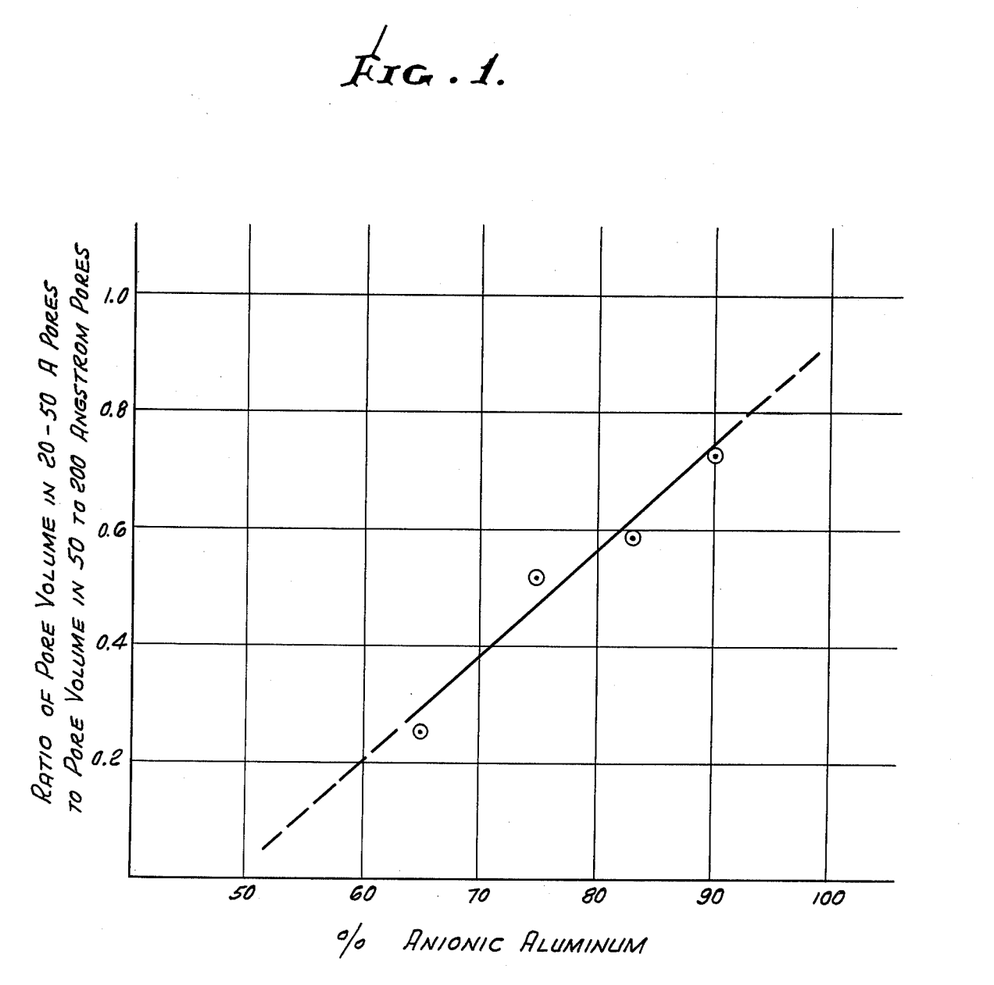

Thus as is shown in Table 1 and FIG. 1, the gels of Example 1, Example 2, Sample 1, and Example 7 all have substantially all of the desorption pore volume and desorption pore surface area concentrated in the 20-50 Angstrom pores, for example as shown in Table 1 about 90% or more of the total desorption pore volume and desorption surface area. They are small pore gels.

The large pore gels of our invention all have a greater percent of the total pore volume in the pores greater than 50 Angstroms as is shown by the ratio of the pore volumes in the 20-50 range to that in the 50-200 range all of which is the large pore gels all substantially less than 1. The pore volume in the larger pores that is above 50 Angstrom diameter are in the major proportion in the pores of 50-200 Angstrom with but be a minor percent in pores above 200 Angstrom as can be seen from Table 1 by subtracting the sum of the percent in the 20-50 and in 50-200 Angstrom from 100%. See Example 2, Samples 2-5.

The effect of the order of addition of the cationic and anionic aluminum employed in the same ratio on the pore structure of the gel may be seen by comparing Example 2 (Sample 3) with Example 3. In Example 2, Sample 3 as also in the other samples of Example 2, the anionic aluminum was mixed with the silicate and the cationic aluminum was added to the mixture. In Example 4, the anionic alumina and cationic aluminas in the ratio of Example 2, Sample 3, were first mixed and the mixture added to the silicate. The percent of the pore volume in the 20-50 is similar to that produced by the order of addition of Example 2, Sample 3. As compared to that of Example 3, there is however a significant

TABLE I

EFFECT OF PERCENT ANIONIC ALUMINUM

| Example | % Anionic Aluminum | Pore Volume in Range of Diameter A cc/gm | | | Pore Volume in Range of Diameter A % 20-600 | | Surface Area in Range of Diameter A $M^{-2}$ | | | Surface Area in Range of Diameter A % of 20-600 | | Ratio of Pore Volume cc/gm in in 20-50/50-200 |
|---|---|---|---|---|---|---|---|---|---|---|---|---|
| | | 20-600 | 20-50 | 50-200 | 20-50 | 50-200 | 20-600 | 20-50 | 50-200 | 20-50 | 50-200 | |
| 1 | 0 | 0.67 | 0.60 | 0.07 | 90 | 10 | 712 | 665 | 47 | 93 | 6.7 | 9 |
| 2 (1) | 50 | 0.49 | 0.47 | 0.02 | 95 | 4.5 | 528 | 514 | 14.5 | 97 | 2.74 | 23.5 |
| 2 (2) | 65 | 0.91 | 0.16 | 0.64 | 17.6 | 70.3 | 465 | 184 | 263 | 40 | 57 | 0.25 |
| 2 (3) | 75 | 0.82 | 0.26 | 0.50 | 32 | 61 | 537 | 290 | 238 | 54 | 44 | 0.52 |
| 2 (4) | 83 | 0.68 | 0.23 | 0.39 | 35 | 57 | 451 | 299 | 143 | 66 | 32 | 0.59 |
| 2 (5) | 90 | 0.66 | 0.17 | 0.24 | 26 | 35 | 354 | 222 | 14.1 | 63 | 28 | 0.71 |
| 7 | 100 | 0.53 | 0.48 | 0.05 | 90 | 9.8 | 629 | 597 | 32 | 95 | 5 | 9.6 |
| 3 | 75 | 0.77 | 0.24 | 0.34 | 31 | 44 | 472 | 283 | 168 | 60 | 36 | 0.71 |
| 5 | 75 | 0.78 | 0.19 | 0.52 | 25 | 67 | 499 | 222 | 268 | 45 | 54 | 0.37 |
| 4 | 75 | 0.96 | 0.16 | 0.65 | 17 | 67 | 483 | 192 | 268 | 40 | 55 | 0.25 |
| 6 | 0 | 0.78 | 0.32 | 0.41 | 41 | 52 | 603 | 376 | 230 | 62 | 36 | 0.78 |

The gels of Example 2 reported in Table 1 were all formed by the same procedure. The percent of the alumina entering the gel contributed by the aluminate varied from 50% to 100%.

Figure 2:
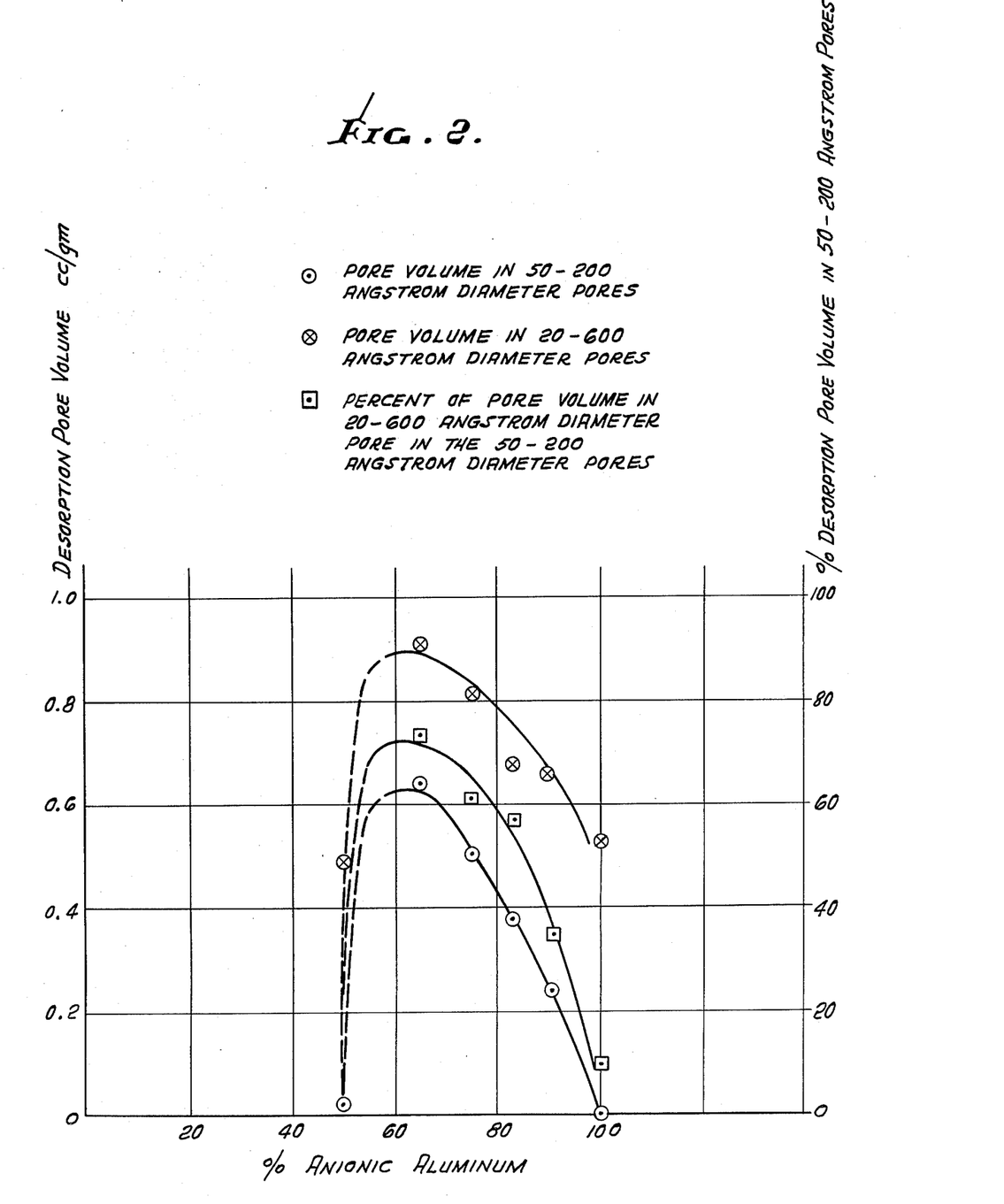

As appears from Table 1 and FIGS. 1 and 2, the silica-alumina gels in which the ratio of the $SiO_2$ to the $Al_2O_3$ are in ratios of more than 1 and less than 3 according to our invention, derived above from all cationic alumina, or all anionic alumina or a mixture of anionic and cationic alumina are of two distinct classes.

The gels formed of alumina derived from an alumina source which is a mixture of anionic and cationic aluminum in which the weight ratios of the alumina equivalent $Al_2O_3$ derived from the anionic alumina is less than about 50% of the total weight of the alumina or derived from only anionic alumina used in forming the gel are small pore gels.

increase in the pores in the range above 200 Angstroms; from 8% in the gel of Example 2, Sample 3 to 29% in the gel of Example 3.

The gel of Example 3 classifies as a large pore gel.

A surprising property of the gels of our invention is the alteration in the pore structure of the gel by extrusion of the gel and subsequent calcination. This is illustrated by Example 5 in which the gel formed as in Example 2, Sample 3, is extruded through a die and then calcined. The extrusion resulted in a minor decrease in the pore volume above 200 Angstroms and an increase in the volume in the pores in the 50-200 range. The pellets classified as a large pore substrate.

The effect of the hydrothermal treatment of the gels of the $SiO_2/Al_2O_3$ ratio of the gels of our invention is particularly pronounced. This effect is of the same order whether the gels are of the cationic aluminum type or of the mixed cationic-anionic aluminum type. This can be seen by comparing the gel of Example 2, Sample 3, with the same gel which has been hydrothermally treated as in Example 4. The gel which was formulated using the 75% anionic to 25% cationic ratio after hydrothermal treatment had a pore structure more similar to that of the gel of Example 2, Sample 2. As can be seen from Table 1 the hydrothermal treatment resulted in an increase in pore volume, a substantial decrease in the percent pore volume in the 20–50 Angstrom diameter range and a shift of this decrease to the volume in the 50–200 Angstrom range. The pore structure of the 65/35 Example 2, Sample 2 and Example 4 type have more open pores than do the pores of the series of the pores of the other large pore anionic-cationic gel sequence.

The effect of the hydrothermal treatment of the gel is pronounced in the case of the cationic gel of Example 1. When it is hydrothermally treated the small pore gel is converted into a large pore gel. Compare Example 7 with Example 1. The gel of Example 7 is similar in pore structure to the gel of Example 3 and may be classified as a large pore gel.

FIG. 1 plots the relation of the ratio of the desorption pore volume in the 20 to 50 Angstrom diameter pores to the desorption pore volumes in the 50 to 200 Angstrom diameter pores as a function of the equivalent weight percent of the alumina derived from the anionic alumina, where this weight percent is in the range of more than 50% and less than 100%. The line of FIG. 1 plots the data of Table 1. The linear relation so plotted indicates that the minimum % of the anionic is more than 49% and the maximum is less than 100%.

FIG. 2 plots the effect of the composition of the alumina source on the desorption pore volume in the 20–600 Angstrom diameter pores, the desorption pore volume in the 50–200 Angstrom diameter pores and the percent of the volume in these pores to the total volume, i.e., in the 20–600 Angstrom diameter pores.

The preferred embodiment of our invention is the large pore silica-alumina gels in which the mole ratio of the $SiO_2$ to the $Al_2O_3$ of the gel on a volatile free basis is in the range of about 1 to about 3 preferably about 1.5 to 2.5, and in which the desorption pore volume present in the pores of 20–600 Angstrom diameter range is in excess of about 0.6 cc/gr to about 0.9 cc/gr on a dry basis. The desorption pore volume in the pores of 20 to 50 Angstroms diameter is less than about 20% of the desorption pore volume in the 20 to 600 Angstrom pores and the desorption pore volume in the pores of 50 to 200 Angstrom pores is in the range of about 20% to about 75% of the desorption pore volume in the 20–600 Angstrom range and the ratio of the desorption pore volume in the 20–50 Angstrom diameter pore range to the desorption pore volume in the 50 to 200 Angstrom diameter range is less than 1 and preferably less than 0.8 and more than about 0.1.

Such gels may be made by reacting a water dispersable $SiO_2$ source such as a salt of silica and a source of $Al_2O_3$ in the form of a mixture of anionic aluminum, preferably a water dispersible aluminate such as an alkali metal aluminate, and cationic aluminum preferably such as an aluminum salt of a mineral and e.g. aluminum sulfate, aluminum nitrate, or aluminum chloride.

The weight of the $Al_2O_3$ on a volatile free basis which is equivalent to the weight of the anionic aluminum employed in the formation of the gels of our invention prepared from both cationic and anionic aluminum is less than about 98% and more than about 50%. Preferably 95% to about 55% of the total weight of the alumina on a volatile free basis in the gel formed according to our invention is derived from anionic aluminum and the remaining percent of the weight of alumina in the gel is derived from the cationic component of the alumina source.

A more preferred ratio of the cationic to anionic alumina is about 60% to about 90% by weight of the $Al_2O_3$ in the gel derived from anionic aluminum and about 40% to about 10% by weight is derived from the cationic alumina.

Such gels may be obtained by mixing the silicate with the anionic alumina and then adding the cationic alumina. The anionic alumina sources may be first mixed and then combined with the silicate. The pH is adjusted to about 8 to about 9 with a base preferably ammonia and heated as described in the Examples.

The gel thus formed may be spray dried to form microspheres of about 50–70 microns average diameter or extruded or otherwise formed into pellets and calcined as is usual for alumina pellets employed as substrate for catalysts.

The gel may be hydrotreated by digesting the gel in an aqueous medium under pressure at a temperature substantially about the atmospheric boiling point for example 250°–500° F. for several hours.

An other procedure for forming the large pore gels of our invention is to form the gel of the above molar ratios using cationic aluminum as the sole source of alumina and adjusting the pH to the range of about 8 to about 9 and hydrothermally treating the resultant gel as was described for the cation-anionic gels.

The large pore gels are useful as cracking catalysts and particularly as starting gels for the high pressure digestion under autogenous pressures at temperatures from about 25° F. to about 500° F. in the presence of monovalent cations such as H derived from acids or ammonium ion in water solution or polyvalent cations such as rare earth cations, or alkaline earth cations by procedures as described in our parent applications which are hereby incorporated herein by this reference. The gels may thus be exchanged with the said cations to introduce said cations.

The gels of our invention are useful as substrates for production of hydrogenation or hydrodesulfurizing or hydrocracking or hydroforming catalyst or for promoting the conversion of $SO_x$ in cracking processes by impregnating the dry gels or after formation into pellets as by extrusion and calcination, with compounds of metals acting catalytically in these processes which have been used with other substrates such as alumina for such catalysts.

This procedure is analogous, to the incorporation of the same catalytic metal on alumina in the prior art for production of catalysts for the above processes.

Examples are hydrodesulfurizing catalyst containing the Group VIII metals such as Fe, Ni, or Co, usually also combined with Group VIB metals such as Mo or W in hydrodesulfurizing compounds. Such catalysts employing alumina as substrate are well known in the art and have been used in commercial catalysts (see Pat. 4,018,714).

The calcined gels may incorporate the corresponding oxides of the metals, for example, the following percentages of the metal Mo about 7 to about 10%, Ni or Co, or both about 2 to 5%, as oxide based on the catalyst on a volatile free basis.

The calcined gels of our invention may also act as a substrate for platinum and paladium metals and metal compounds in hydrogenation process such as conversion of unsaturated hydrocarbons, hydrocracking, hydroreforming as in the prior art substituting the calcined gels of our invention for the currently used substrates such as alumina.

Another use of the gels of our invention is as a support for the platinum metals, e.g. platinum or palladium in catalytic convertors in automobiles. They may also be used in catalytic cracking as catalysts for conversion of CO to $CO_2$ and $SO_2$ to $SO_3$ in the regenerators of catalytic cracking units.

The silica-alumina gels of our invention may also be used as matrix material in zeolite containing cracking catalyst employing them in the place of the silica-alumina gels as set forth in U.S. Pat. No. 4,142,995 incorporated herein by this reference.

Thus for example the filter cake as produced as in Example 2 Samples 2 to 5 or Example 3 or Example 4 in the form of the filer cake is used as a matrix material for an exchanged zeolite. Instead the gel of the above examples may be formed in the presence of the zeolite according to the procedure of Example 4 of U.S. Pat. No. 4,142,995.

The zeolite is preferably a Y zeolite of $SiO_2/Al_2O_3$ ratio of in excess of 4 for example up to about 6 and having a sodium content expressed as $Na_2O$ on a volatile free basis of less than about 5% for example from about 1% to about 5%, the remaining exchange capacity of the zeolite being occupied by other actions, for example one or more of the following $H, NH_4$ and polyvalent catrons such as rare earth cartrons. The matrix may also contain, clay such as the kaolin, ballclay or alumina such as pseudoboehmite or both clay and pseudo boehmite.

We prefer to use the pseudoboehmite which has a "peptizeability index" of above 0.5% according to the test procedure described in U.S. Pat. No. 4,086,187 incorporated herein by this reference.

Suitable and preferred compositions of the cracking catalyst of our invention is comprized the Y zeolite of the above sodium content preferably also substituted by $NH_4$ or rare earth cations or both said cations. The said zeolite being present in the range of from about 5% to about 30% of the composite catalyst on a volatile free basis. The catalyst containing also the silica-alumina gels of our invention as stated above as the remaining portion of the matrix, i.e. 95% to 70% of the composite catalyst on a volatile free basis. The matrix may also contain in addition to the silica-alumina gel, clay for example kaolin clay such as ball clay or pseudoboehmite or both clay and pseudoboehmite. Where either of the latter or both are used in the matrix, the silica-alumina gel is preferably in the range of 60 to 10 parts by weight of the composite catalyst, the remaining portion of the matrix being clay or pseudoboehmite or both to add to 100 parts by weight of the composite catalyst on a volatile free basis. When both the clay and the pseudoboehmite are used, the clay is used in the range of 70 to 10 parts by weight and the pseudoboehmite is used in the range of about 10 to 20 parts by weight all adding to 100 parts by weight of composite catalyst on a volatile free basis.

Water slurries of the zeolite and the matrix are spray dried to form microspheres of about 50–70 micron average diameter. They are useful as cracking catalyst to crack petroleum fractions in conventional fluid catalytic cracking processes as will be evident to those skilled in this art.

We claim:

1. A silica-alumina gel having a nominal $SiO_2$ to $Al_2O_3$ mole ratio in the range of about 1 to about 3 and having a pore structure such that the desorption pore volume in the range of pores 20 to 600 Angstroms diameter is about 0.6 or more cc/gr and the desorption pore volume in the range of pores of 20 to 50 Angstroms diameter is less than about 50% of the said desorption pore volume in the pores of 20 to 600 Angstroms and substantially less than the desorption pore volume in the pores in the range of 50 to 200 Angstroms diameter.

2. The silica-alumina gel of claim 1 in which the ratio of the desorption pore volume of the pores in the range of the 50 to 200 Angstroms is more than 20% and less than 75% of the desorption pore volume in the pores in the range of 20 to 600 Angstroms diameter.

3. The gel of claim 1 ratio of the desorption pore volume in the pores in range of the 20–50 Angstrom diameter to the desorption pore volume in the pores in the range of 50–200 Angstroms diameter range is in the range of about 0.1 to about 0.8.

4. The gel of claim 3, in which the ratio of the desorption pore volume in the pores in the range of 20 to 50 Angstrom diameter to the desorption pore volume in the pores in the range of 50 to 200 Angstrom diameter is more than 20% and less than 75% of the desorption pore volume in the range of 20 to 600 Angstrom diameter.

5. A process of producing a silica-alumina gel which comprises combining in a reaction mixture, sodium silicate, with an anionic aluminum and a cationic aluminum in amounts equivalent to a ratio of the moles of $SiO_2$ to the moles of $Al_2O_3$ in the cationic and anionic aluminum in the range of about 1 to about 3 moles of $SiO_2$ per mole of $Al_2O_3$ and the equivalent weight of $Al_2O_3$ in the anionic aluminum being less than 95% and more than 50% of the total equivalent weight of $Al_2O_3$ in the cationic and anionic aluminum source and adjusting the pH of the reaction mixture to a range of about 8 to about 9.

6. The process of claim 5, in which the equivalent weight of the $Al_2O_3$ in the anionic aluminum is from about 60% to about 95% of the equivalent weight in the cationic and anionic aluminum.

7. The process of claim 5 in which the anionic aluminum is sodium aluminate and the cationic aluminum is an aluminum salt of a mineral acid.

8. The process of claim 6, in which the anionic aluminum is sodium aluminate and the cationic aluminum is an aluminum salt of a mineral acid.

9. A method of producing a silica-alumina gel which comprises mixing sodium silicate with an anionic aluminum and mixing said mixture with a cationic aluminum in amounts equivalent to a ratio of the moles of $SiO_2$ to the moles of $Al_2O_3$ in the cationic and anionic aluminum in the range of about 1 to about 3 moles of $SiO_2$ per mole of $Al_2O_3$ and the equivalent weight of $Al_2O_3$ in the anionic aluminum being less than 95% and more than 50% of the total equivalent weight of $Al_2O_3$ in the cationic and anionic aluminum source and adjusting the pH of the reaction mixture to a range of about 8 to about 9.

10. The process of claim 9 in which the equivalent weight of the $Al_2O_3$ in the anionic aluminum is from about 60% to about 95% of the equivalent weight in the cationic and anionic aluminum.

11. The process of claim 9, in which the anionic aluminum is sodium aluminate and the cationic aluminum is an aluminum salt of a mineral acid.

12. The process of claim 10, in which the anionic aluminum is sodium aluminate and the cationic aluminum is an aluminum salt of a mineral acid.

13. A method of producing a silica-alumina gel which comprises combining sodium silicate with a mixture of an anionic aluminum and a cationic aluminum to form a reaction mixture in which the amounts of the reaction times are equivalent to a ratio of the moles of $SiO_2$ to the moles of $Al_2O_3$ in the cationic and anionic aluminum in the range of about 1 to about 3 moles of $SiO_2$ per mole of $Al_2O_3$ and the equivalent weight of $Al_2O_3$ in the anionic aluminum being less than 95% and more than 50% of the total equivalent weight of $Al_1O_3$ in the cationic and anionic aluminum source and adjusting the pH of the reactant mixture to a range of about 8 to about 9.

14. The process of claim 13 in which the equivalent weight of the $Al_2O_3$ in the anionic aluminum is from about 60% to about 95% of the equivalent weight in the cationic and anionic aluminum.

15. The process of claim 13, in which the anionic aluminum is sodium aluminate and the cationic aluminum is an aluminum salt of a mineral acid.

16. The process of claim 14 in which the anionic aluminum is sodium aluminate and the cationic aluminum is an aluminum salt of a mineral acid.

17. The process of claim 5, in which the gel is heated in an aqueous medium under autogenous pressures at a temperature in the range of 250 to 500° F.

18. The process of claim 17, in which the equivalent weight of the $Al_2O_3$ in the anionic aluminum is from about 60% to about 95% of the equivalent weight in the cationic and anioic aluminum.

19. The process of claim 17, in which the anionic aluminum is sodium aluminate and the cationic aluminum is an aluminum salt of a mineral salt.

20. The process of claim 18, in which the anionic aluminum is sodium aluminate and the cationic aluminum is an aluminum salt of a mineral acid.

21. The process of claim 9 in which the gel is heated in an aqueous medium under autogenous pressure at a temperature of about 250° to 500° F.

22. The process of claim 21 in which the equivalent-weight of the $Al_2O_3$ in the anionic aluminum is from about 60% to about 95% of the equivalent weight in the cationic and anionic aluminum.

23. The process of claim 21 in which the anionic aluminum is sodium aluminate and the cationic aluminum is an aluminum salt of a mineral acid.

24. The process of claim 22, in which the anionic aluminum is sodium aluminate and the cationic aluminum is an aluminum salt of a mineral acid.

25. The process of claim 9, in which the gel is heated under autogenous pressure at a temperature of about 250 to 500° F.

26. The process of claim 25 in which the equivalent weight of the $Al_2O_3$ in the anionic aluminum is from about 60% to about 95% of the equivalent weight in the cationic and anionic aluminum.

27. The process of claim 25, in which the anionic aluminum is sodium aluminate and the cationic aluminum is an aluminum salt of a mineral acid.

28. The process of claim 27, in which the anionic aluminum is sodium aluminate and the cationic aluminum is an aluminum salt of a mineral acid.

29. The process of claim 13, in which the gel is heated under autogenous pressure at a temperature of about 250 to 500° F.

30. The process of claim 29, in which the equivalent weight of the $Al_2O_3$ in the anionic aluminum is from about 60% to about 95% of the equivalent weight in the cationic and anionic aluminum.

31. The process of claim 29, in which the anionic aluminum is sodium aluminate and the cationic aluminum is an aluminum salt of a mineral acid.

32. The process of claim 30, in which the anionic aluminum is sodium aluminate and the cationic aluminum is an aluminum salt of a mineral acid.

33. An extruded and calcined pellet of the silica-alumina gel according to claims 1, 2 or 3.

34. A calcined extruded pellet comprising a silica-alumina gel in which the $SiO_2/Al_2O_3$ molar ratio is in the range of about 1 to about 3.

35. The process of claims 5, 9 or 13, in which the silica-alumina gel is extruded to form a pellet and the extruded gel is calcined.

* * * * *

UNITED STATES PATENT AND TRADEMARK OFFICE
CERTIFICATE OF CORRECTION

PATENT NO. : 4,310,441
DATED : January 12, 1982
INVENTOR(S) : Hamid Alafandi and Dennis Stamires It is certified that error appears in the above-identified patent and that said Letters Patent are hereby corrected as shown below:

Column 2, Line 68, insert --Equation 13--

Column 3, Line 4, insert --Equation 4--

Column 3, Line 50, insert --Equation 8--

Column 4, Line 35, "and" should be --are--

Column 9, Line 24, "$M^2/gm$" should be --$M^{-2}/gm$--

Column 9-10, Table I in heading "$M^{-2}$" should be --$M^{-2}/gm$--

Column 15, Line 17, "$Al_1O_3$" should be --$Al_2O_3$--

Signed and Sealed this

Thirteenth Day of July 1982

[SEAL]

Attest:

GERALD J. MOSSINGHOFF

Attesting Officer   Commissioner of Patents and Trademarks